United States Patent [19]
Janse van Vuuren

[11] Patent Number: 5,826,551
[45] Date of Patent: Oct. 27, 1998

[54] PROCESS AND DEVICE FOR CONTROLLING THE LIFT OF AN INTERNAL COMBUSTION ENGINE VALVE

[75] Inventor: Willem Nicolaas Janse van Vuuren, Tabb, Va.

[73] Assignee: Siemens Automotive S.A., Toulouse Cedex, France

[21] Appl. No.: 640,927

[22] PCT Filed: Nov. 2, 1994

[86] PCT No.: PCT/EP94/03606

§ 371 Date: May 6, 1996

§ 102(e) Date: May 6, 1996

[87] PCT Pub. No.: WO95/12751

PCT Pub. Date: May 11, 1995

[30] Foreign Application Priority Data

Nov. 5, 1993 [FR] France .................................. 93 13186

[51] Int. Cl.⁶ .................. F01L 9/02; F01L 13/00
[52] U.S. Cl. .................. 123/90.12; 123/90.15; 123/90.16
[58] Field of Search ............. 123/90.11, 90.12, 123/90.13, 90.15, 90.16, 90.17

[56] References Cited

U.S. PATENT DOCUMENTS

| | | | |
|---|---|---|---|
| 4,133,332 | 1/1979 | Benson | 123/198 F |
| 4,615,306 | 10/1986 | Wakeman et al. | 123/90.16 |
| 4,724,810 | 2/1988 | Poirier et al. | 123/339 |
| 4,796,573 | 1/1989 | Wakeman et al. | 123/90.16 |
| 5,193,494 | 3/1993 | Sono et al. | 123/90.12 |
| 5,363,817 | 11/1994 | Ikeda et al. | 23/90.15 |
| 5,503,120 | 4/1996 | Shirey et al. | 123/90.12 |

FOREIGN PATENT DOCUMENTS

| | | |
|---|---|---|
| 0 446 065 A2 | 9/1991 | European Pat. Off. . |
| 2 133 288 | 11/1972 | France . |
| 2 197 908 | 6/1988 | United Kingdom . |
| 92/07172 | 4/1992 | WIPO . |

*Primary Examiner*—Weilun Lo
*Attorney, Agent, or Firm*—Herbert L. Lerner; Laurence A. Greenberg

[57] ABSTRACT

The invention applies to the control of the variable opening and closing of an intake valve.

According to the invention, a set-point position ($\alpha_c$) for an event related to the valve is calculated continuously. Upon the detection of a change in the set-point ($\alpha_c$) or in the engine speed (N), the establishment of the new set-point is controlled in an open loop during at least the first engine cycle following the detection of the set-point change, and b) the adjustment to the new set-point is controlled in a closed loop during subsequent engine cycles. The control is applied to a mechanism for triggering the event with an advance (AV) on the event. In each open-loop control cycle, this advance is read in a stored table, as a function of the engine speed (N) and the set-point position ($\alpha_c$) calculated for the event.

14 Claims, 2 Drawing Sheets

PROCESS AND DEVICE FOR CONTROLLING THE LIFT OF AN INTERNAL COMBUSTION ENGINE VALVE

BACKGROUND OF THE INVENTION

1. Field of the Invention

The present invention relates to a process for controlling the lift of a valve of an internal combustion engine cylinder, and more specifically, to a process of this type which makes it possible to vary the opening time of such a valve by controlling the triggering of "events" related to this valve. The object of the present invention is also to provide a device for implementing this process.

Conventionally, the "lift" of an intake or exhaust valve is controlled by a cam which is interdependent with the crankshaft of the engine or with a camshaft which rotates in sync with the crankshaft. The mechanical link established between each valve and the associated control cam is desmodromic, and thus the "events" constituted by the opening or closing of the valve occur at predetermined, invariable moments in the operating cycle of the engine, or "engine cycle."

It is currently proposed that these events be made to occur in a controlled, variable way, in order to adjust, for example, the quantity of air or air/fuel mixture taken in by a cylinder of the engine, or even the quantity of exhaust gas retained in this cylinder, as described, for example, in French patent 2 133 288.

This presupposes the availability of means which make it possible to control the "lift" of the valves with the requisite flexibility, a flexibility which is absent from the conventional cam mechanisms. Electromechanical devices, for example with electromagnets, and mechanohydraulic devices such as that represented in FIG. 1 of the appended drawing, have been specifically designed for this purpose.

The latter device comprises, as shown, a conventional cam 1 which acts on a valve 2 through a chamber 3 which is fixed in relation to the engine 4, filled with a liquid under pressure such as the lubricating oil for the engine, delivered by an oil pump 5 through a conduit 6 equipped with a nonreturn valve 7.

The chamber 3 is closed by two end pistons 8 and 9. The piston 8 is normally loaded against the cam 1 by the oil pressure established in the chamber. The valve 2 is interdependent with the piston 9, and loaded against its seat by a spring 10 which is powerful enough so that the oil pressure in the chamber 9 alone cannot cause a "lift" of the valve. A two-way solenoid valve 11 with two positions makes it possible to control the oil pressure in the chamber, by selectively connecting it to a tank 12 out in the open. Devices of this type are well known, and further details related to them could be obtained by referring to U.S. Pat. Nos. 4,133,332, 4,615,306 and 4,796,573.

The operation of the mechanism represented in FIG. 1 is described as follows: When the solenoid valve 11 is driven to be in the position shown in the figure, the chamber 3 is disconnected from the tank 12 and the nonreturn valve 6 prevents any backflow of oil toward the conduit 6. The incompressibility of the oil contained in the chamber 3 results in the transmission of the displacements of the piston 8, under the pressure from the cam 1, to the piston 9 and to the valve 2. Therefore this valve is subject to the displacements imposed on it by the cam 1. If the solenoid valve is driven so as to connect the chamber 3 with the tank 12, the pressure in this chamber drops and the chamber empties, at least partially, into the tank when the cam 1 causes the piston 8 to descend. At this point there is no longer a transmission of the displacements of the piston 8 to the valve, which remains in its seat in the closed position.

It is understood that by controlling the excitation of the event triggering device constituted by the solenoid valve 11, it is possible to vary the instants at which the valve 2 opens or closes, since the mechanism described has a short response time which is consistent with the duration of the operating cycles of the engine, even at high speed.

This control presupposes that a computer 13 associated with the engine generates and delivers, to another computer 14 for controlling the lift of the valve, a set-point value $\alpha_c$ which indicates, for example, the angular position of the crankshaft at which a controlled "valve event," such as the opening or closing or this valve, must occur. Modern automobiles are usually equipped with an ignition and/or injection computer, supplied by sensors of the angle of the crankshaft $\alpha_{vil}$ and/or of the engine speed N, the pressure P in the intake manifold of the engine, the temperature T of the coolant, the position Ac of the accelerator pedal, etc., for generating controls for the ignition-advance angle A, the opening time $t_i$ of a fuel injector, etc. A computer, like that labelled 13 in FIG. 1 is therefore capable of generating, from certain signals received from the above-mentioned sensors, particularly from the signal representing the engine speed, the above mentioned set-point value $\alpha_c$ which indicates the angular position of the crankshaft at which the opening or closing of the valve must occur, in accordance with a strategy stored in the computer and executed by it, for adjusting the quantity of air taken in by a cylinder during the opening time of an intake valve of this cylinder.

This poses the problem of tracking this set-point value generated by the computer 13 and delivered to the computer 14. It is possible, first of all, to consider ensuring this tracking by means of a closed-loop control device with, for example, proportional and/or integral and/or derivative correction, as is well known. The attempts made in this direction have made it apparent that the response times introduced by the utilization of a control of this type are too long to be tolerable in view of the constraints related to fuel consumption and pollution which must be complied with in the operation of internal combustion engines, particularly when they propel automobiles. In effect, it has been determined that the adjustment of the set-point, in the case of closed-loop control, would currently require a time corresponding to the duration of several engine cycles.

Therefore, the object of the present invention is to provide a process for controlling an event related to an internal combustion engine cylinder valve, such as the opening or closing of this valve, a process which is capable of continuously ensuring the occurrence of this event at a controlled instant with precision, with a short response time consistent with the constraints related to fuel consumption and pollution which apply to the internal combustion engine, particularly when it propels an automobile.

Another object of the present invention is to produce a device for implementing such a process.

This object of the invention, as well as others which will become apparent through a reading of the description which follows, is achieved by means of a process for controlling the lift of a valve of an internal combustion engine cylinder, according to which a set-point position for an event related to this valve is calculated continuously, and a mechanism for triggering this event is controlled, which process is remarkable in that, upon the detection of a change in the set-point or in the speed of the engine, this mechanism is controlled in an open loop as a function of the new set-point during at least the first engine cycle following the detection of the set-point change, and it is then controlled in a closed loop for adjusting to the new set-point during at least one of the subsequent engine cycles.

As will be seen below, thanks to the initial open-loop control established in this way, the number of engine cycles necessary to adjust to the set-point in a closed loop is reduced considerably. With the establishment of the new set-point value thus accelerated, the duration of deviations in the opening and/or closing set-points of the various valves of the engine, which deviations generate excessive fuel consumption and an increase of toxic gasses in the engine exhaust, is reduced.

In another characteristic of the process according to the invention, the mechanism for triggering the event is controlled with an advance on the event, and in each open-loop control cycle, this advance is read in a stored table, as a function of the engine speed at the set-point position calculated for the event.

In yet another characteristic of the process according to the invention, at the end of each closed-loop control phase, the advance which made it possible to attain the set-point is calculated and the advance table is updated with this new advance value.

The invention also provides a device for implementing the process according to the invention, which comprises means for calculating a set-point position for an event related to the valve and means for controlling a mechanism for triggering this event, which device is remarkable in that it comprises a sensor which senses the occurrence of this event, calculation and control means, supplied with the set-point position determined by the calculation means, by a signal emitted by this sensor and by a signal which represents the engine speed and/or the angular position of the crankshaft of the engine, for controlling the triggering mechanism in an open loop as a function of the new set-point, during at least the first engine cycle following a variation of the set-point or the speed, and for controlling the cancellation of the error separating the new position of the set-point from the current position of the event, as detected by this sensor, in a closed loop during subsequent engine cycles.

Other characteristics and advantages of the present invention will become apparent through a reading of the description which follows and an examination of the appended drawing in which:

DESCRIPTION OF THE PREFERRED EMBODIMENT

Figure 2:
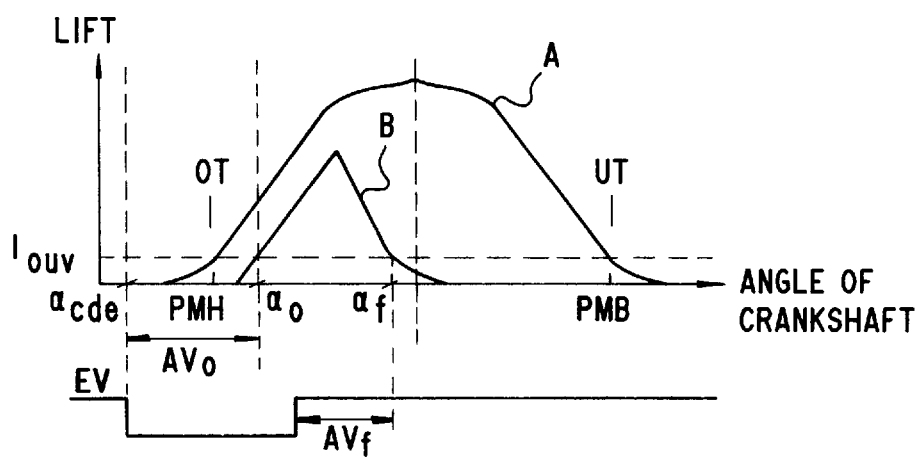
FIG. 2 represents graphs which may be used to explain the operation of the device in FIG. 1.

Refer to the graphs in FIG. 2 which represent, in A, the graph of the conventional "lift" of a valve under the sole action of a cam, as a function of the angular position of the crankshaft. On the axis of abscissas, points PMH and PMB are shown, which conventionally correspond to a top dead center and a bottom dead center, respectively, of the piston operating in the cylinder equipped with the valve. Thus, the lift of the valve appears to have a bell shape with a maximum situated between successive points PMH and PMB.

Figure 1:
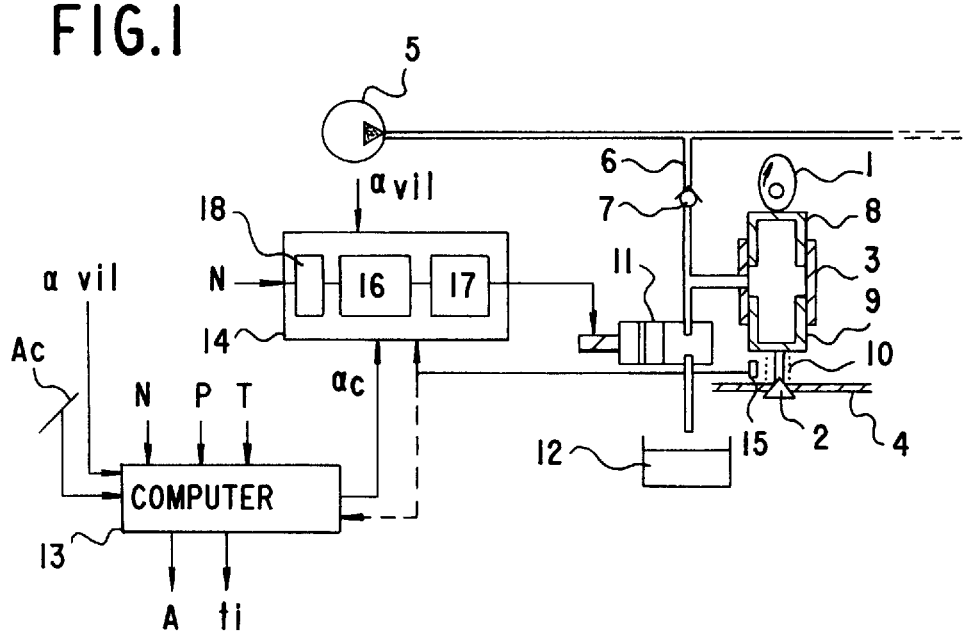
FIG. 1 schematically represents a device for implementing the process according to the invention, which has already been partially described in the preamble of the present description.

A graph of the lift of a valve with a controlled opening angle $\alpha_o$ and closing angle $\alpha_f$ is illustrated in B. According to the invention, as shown in FIG. 1, the opening or closing of a valve is detected by means of a position sensor 15 of any type, for example the variable magnetic reluctance or Hall-effect type, disposed in proximity to the valve in order to be sensitive to its displacements. Also according to the invention, the opening angle $\alpha_o$ is defined as being the angular position of the crankshaft at which the lift of the valve, as read by the sensor 15, passes a displacement threshold $1_{ouv}$, which is low but not null. Thus, a certain number of "noises" which affect the operation of the sensor 15 are filtered from the computer 14 which receives the signal emitted by the sensor and from the wiring connecting them to one another.

The closing angle $\alpha_f$ is indicated in the same way as the angle $\alpha_o$, by passing a threshold $1_{ferm}$ which can be different from $1_{ouv}$ but which has been represented as identical to it in FIG. 2, for purposes of clarity in this figure.

Also represented in FIG. 2 is the logic diagram EV of the control of the solenoid valve 11, which varies between a low state, in which the solenoid valve is in the position shown in FIG. 1, and a high state in which the solenoid valve connects the chamber 3 to the tank 11.

Thus, FIG. 2 shows that when desiring to trigger the opening of the valve at $\alpha_o$, it is necessary to control the tilt of the solenoid valve in the low state to the angular position $\alpha_{cde}=\alpha_o-AV_o$, with an angular advance $AV_o$ on the position $\alpha_o$. Likewise, the closing of the valve at the angular position $\alpha_f$ requires a control of the solenoid valve to the angular position $\alpha_{cde}=AV_f-AV_f$.

These advances to the opening $AV_o$ and to the closing $AV_f$ result from the response times of the solenoid valve on the one hand, and of the chamber 3 on the other hand.

Thus, the point is for the computer 14 to deliver excitation and de-energization signals to the solenoid valve at the instants corresponding to the angular positions $\alpha_{cde}$ defined above, so that the actual angular positions $\alpha_o$ and $\alpha_f$ of the opening and closing of the valve, respectively, correspond to angular set-point positions $\alpha_c$ calculated by the computer 13 and provided by the latter to the computer 14.

In FIG. 1, it will be noted that this computer conventionally comprises electronic calculation and control means 16, electronic power supply means 17, controlled by the electronic means 16, for delivering an appropriate power signal to the solenoid valve 11, and a memory 18 associated with the electronic calculation and control means 16. According to the invention, this memory stores values of the above-mentioned advances $AV_o$ and $AV_f$, mapped as a function of parameters such as the engine speed N and the opening or closing set-point value $\alpha_c$ calculated by the computer 13. As will be seen below, these mapped advance values are used in the open-loop control phases established by the control process according to the invention.

Figure 3:
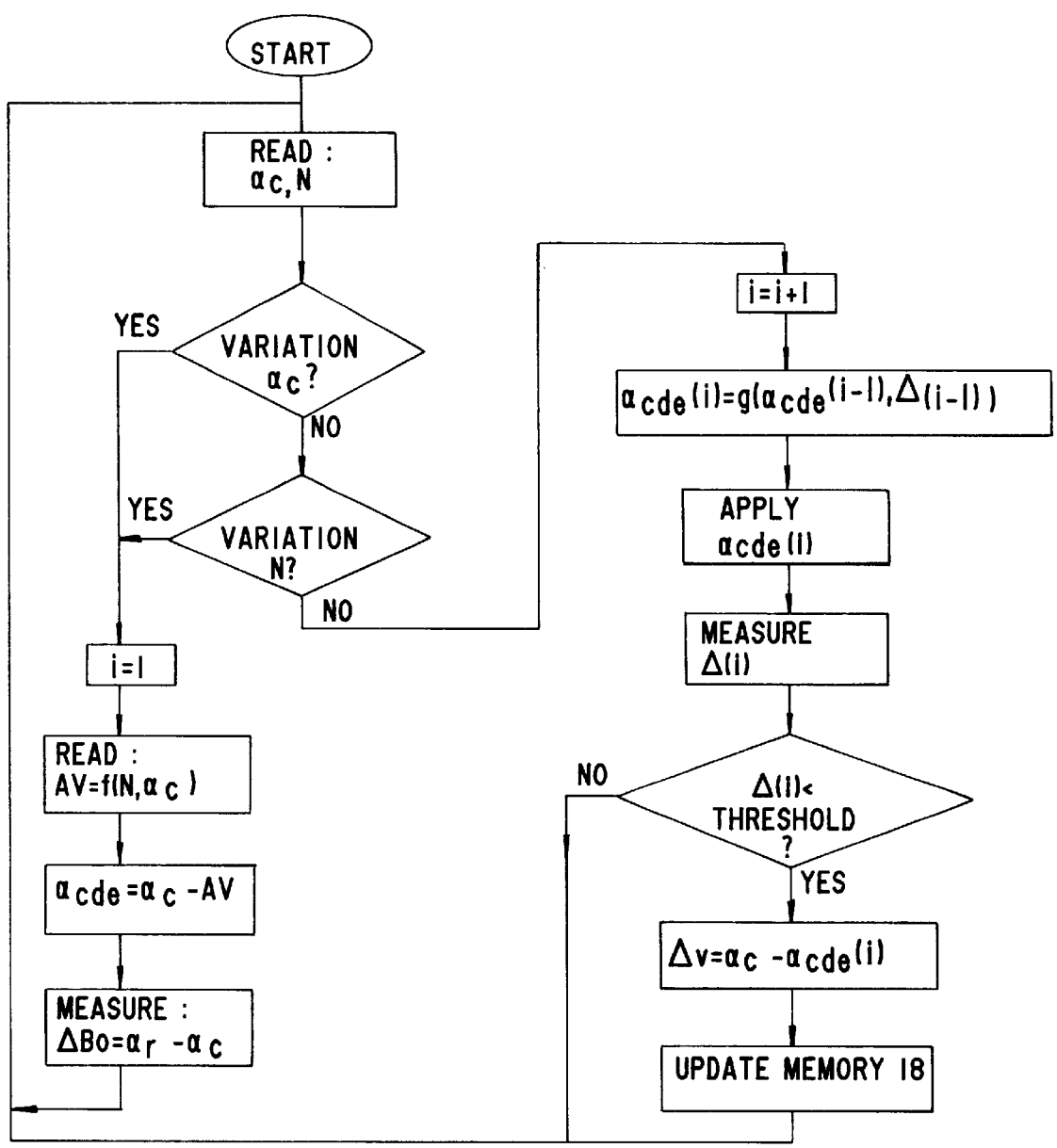
FIG. 3 is a flow chart of the control process according to the invention.

In this respect, this control process is described in reference to the flow chart in FIG. 3. At the start of the flow chart, the electronic control means "read" the engine speed N and the current set-point $\alpha_c$, of the opening for example, as it has been calculated and delivered by the computer 13. The computer 14 then executes a first test to determine if there has been a variation of the set-point, in which case the current set-point would differ from the set-point received during the preceding engine cycle, as the engine cycle serves as the periodic basis for the repetition of the calculations. According to the invention, these calculations are advantageously executed at the moment of the top dead center which follows the ignition spark.

If there has not been a variation of the set-point $a_c$, the computer executes a second test for detecting a possible variation in the speed N.

If either of these two tests is positive, it means that conditions exist which are capable of varying the advance $AV_o$ to the opening which must be used to attain the opening set-point value. The computer then executes a sub-program for controlling the solenoid valve 11 in an open loop, during the first engine cycle (i=1) following the detection of one of the two variations monitored by the tests. The first step of this sub-program consists of reading, in the memory 18, the value of $AV_o$ which corresponds to the current values of the speed N and the set-point $\alpha_c$. In the next step, the control angle $\alpha_{cde}$ of the solenoid valve 11 is calculated:

$$\alpha_{cde} = \alpha_c - AV_o$$

and compared to the current angular position $\alpha_{vil}$ of the crankshaft. When these angles coincide, the electronic power supply means 17 generate a control signal for the solenoid valve 11. Next, the error $\Delta_{bo} = \alpha_r - \alpha_c$ is calculated at the end of the open-loop control, from the measurement of the real opening angle $\alpha_r$ derived from the signal supplied by the sensor 15. This error is then used during the next engine cycle (i+1=2) as an error signal within the framework of a closed-loop control established by the electronic control means 16.

As shown in the flow chart in FIG. 3, the closed-loop control is effected, conventionally, by calculating the control angle $\alpha_{cde}(i)$ during the engine cycle i as a function of the control angle $\alpha_{cde}(i-1)$ and the error $\Delta(i-1)$ observed during the preceding engine cycle (i-1):

$$\alpha_{cde}(i) = \alpha_{cde}(i-1) - k \cdot \Delta(i-1)$$

in which k is a coefficient which is advantageously mapped as a function of the speed N and the set-point $\alpha_c$.

Next, the error $\Delta(i)$ between the real opening angle and the current set-point is measured. As long as this error remains above a predetermined threshold, the closed-loop control proceeds and the operations described above repeat at each engine cycle. Thus, a closed-loop control with integral correction with variable gain is established.

When the error $\Delta(i)$ falls below this threshold, the set-point is considered to have been attained, and in another advantageous characteristic of the present invention, the corresponding advance to the opening is then calculated:

$$AV_o = \alpha_c - _{cde}(i)$$

and the table AV=f (N, $\alpha_c$) stored in the memory 18 is updated with the value which has just been calculated.

This updating of the advance table AV gives the adjustment according to the invention great robustness. Thanks to the division of this control into two steps (an open loop followed by a closed loop) the machine learning of the advance AV applied in the open loop is ensured by the subsequent closed loop. The open loop makes it possible to move toward the set-point from the first calculation cycle, to within a zone of linearity where the closed-loop integral adjustment is more effective.

It is understood that the invention is not limited to the embodiment described and illustrated, which has been given only by way of example. Thus, the open-loop control could be extended for two or more engine cycles, in accordance with the judgment of one skilled in the art. The control of the opening angle of the valve described above is easily extended to the control of the closing angle or of the angle of any other event characteristic of this valve, such as the angle of passage through the maximum lift. In addition, the functions of the two computers 13 and 14 could be executed by a single computer, suitably programmed for this purpose.

It will also be noted, incidentally, that the sensor 15 makes it possible to identify the state (open or closed) of the valve with which it is associated. This information, transmitted to the computer 14, can also be used by the computer 13 to recognize the position of the engine during a cycle (two engine revolutions per cycle in a four-stroke engine). Thus, for example, if a signal of the opening of an intake valve of the cylinder 1, in a four-cylinder engine, for example, is detected, it is possible to deduce the state (compression, explosion and expansion, exhaust) of the other cylinders Nos. 2, 3, 4. Thus, for example, the need to dispose an angular position sensor for this purpose next to one of the cams driving the valves, or a pressure sensor in one of the cylinders of the engine, is avoided.

I claim:

1. A method of controlling a lift of a valve in an internal combustion engine cylinder, which comprises:

continuously calculating a set-point position for an event related to a valve of an internal combustion engine cylinder;

upon the detection of a change in the set-point position to a new set-point or a change in the engine speed:
 a) controlling a mechanism for triggering the event in open loop as a function of the new set-point during at least the first engine cycle following the detection of the set-point change; and
 b) controlling the mechanism in closed loop for adjusting to the new set-point during subsequent engine cycles.

2. The method according to claim 1, which comprises controlling the mechanism for triggering the event with an advance on the event, and, in each open-loop control cycle, reading the advance in from a stored advance table, as a function of the engine speed and the set-point position calculated for the event.

3. The method according to claim 2, which comprises, at an end of each closed-loop control phase of step b), calculating the advance which made it possible to attain the set-point, and updating the advance table with the new advance value.

4. A device for controlling a lift of a valve in an internal combustion engine cylinder, comprising:

a computation device for calculating a set-point position for an event related to a valve of an internal combustion engine cylinder, and a mechanism for triggering the event;

a control device connected to and controlling said mechanism for triggering the event, a sensor connected to said control device, said sensor sensing the occurrence of the event and issuing a related signal, said control device receiving the set-point position calculated by said computation device and the signal of said sensor;

said computation device receiving at least one of a signal representing a speed of the engine and a signal representing an angular position of a crankshaft of the engine, and said computation device and said control device being programmed to:

control said triggering mechanism in an open loop as a function of a new set-point, during at least a first engine cycle following a variation of the set-point or the engine speed; and control said triggering mechanism toward a position of the new set-point from the current position, as detected by said sensor, in a closed loop during subsequent engine cycles.

5. The device according to claim 4, wherein said control device controls said mechanism for triggering the event with an advance, and said control device includes a memory for storing the advance, said memory being polled during the open-loop control of the event for supplying the advance, as a function of the current engine speed and the current set-point of the position of the event.

6. The device according to claim 5, wherein said memory is updated with values of the advance established at the end of the closed-loop control phase of the position of the event.

7. The device according to claim 4, wherein the event is an opening instant of the valve.

8. The device according to claim 7, wherein said valve is an intake valve.

9. The device according to claim 4, wherein the event is a closing instant of the valve.

10. The device according to claim 9, wherein said valve is an intake valve.

11. The device according to claim 4, which further comprises a first piston attached to said valve and closing a first end of a chamber of the internal combustion engine, a second piston closing a second end of the chamber, and a cam supporting said second piston, said chamber being filled with incompressible fluid and communicating with a tank, and wherein said mechanism for triggering includes a control valve selectively establishing communication between the chamber and said tank.

12. The device according to claim 11, wherein said control valve is a solenoid valve.

13. The device according to claim 12, wherein said solenoid valve is controlled by said control device through the intermediary of an electronic control.

14. The device according to claim 12, wherein said control device includes an electronic power supply, and said solenoid valve is energized by said electronic power supply.

* * * * *